United States Patent [19]
Levine

[11] Patent Number: 5,373,330
[45] Date of Patent: Dec. 13, 1994

[54] REMOTE-CONTROLLED VCR USING AN ASSOCIATED TV FOR AUDIBLE FEEDBACK

[75] Inventor: Michael R. Levine, Boca Raton, Fla.

[73] Assignee: Smart VCR Limited Partnership, Ann Arbor, Mich.

[21] Appl. No.: 5,726

[22] Filed: Jan. 19, 1993

[51] Int. Cl.$^5$ .............................................. H04N 5/782
[52] U.S. Cl. ................... 348/734; 358/335; 358/310
[58] Field of Search ............ 358/194.1, 335, 310, 358/186; 359/142; 340/825.69, 825.75; 360/33.1; 348/734; H04N 5/44, 5/781, 5/782, 5/40

[56] References Cited

U.S. PATENT DOCUMENTS

| | | | |
|---|---|---|---|
| 4,841,562 | 6/1989 | Lem | 379/104 |
| 4,849,817 | 7/1989 | Short | 358/142 |
| 4,907,003 | 3/1990 | Marshall et al. | 342/352 |

FOREIGN PATENT DOCUMENTS

| | | | |
|---|---|---|---|
| 0190076 | 9/1985 | Japan | H04N 5/00 |
| 0248878 | 5/1990 | Japan | H04N 5/40 |
| 2092347 | 8/1982 | United Kingdom | H04J 9/00 |

*Primary Examiner*—Victor R. Kostak
*Assistant Examiner*—Nathan J. Flynn
*Attorney, Agent, or Firm*—Krass & Young

[57] ABSTRACT

In a video cassette recorder (VCR) adapted for use in conjunction with a television (TV) receiver, a audio signal generator is used to produce an audio signal in response to key closures made on the VCR's remote unit with the TV speaker being used as an audio output device. In an alternative embodiment, the audio generator is in the form of a speech synthesizer which generates a human-voice message in response to commands entered via the keypad. The main VCR housing may alternatively come equipped with its own speaker, obviating the need to feed the audio signals to the TV.

8 Claims, 2 Drawing Sheets

REMOTE-CONTROLLED VCR USING AN ASSOCIATED TV FOR AUDIBLE FEEDBACK

TECHNICAL FIELD

This invention relates to video cassette recorders generally and, in particular, to a video cassette recorder (VCR) including an audio signal generator that provides audible feedback in response to keypad depressions made on the VCR remote control unit, using the speaker in an associated television set as an audio output device.

BACKGROUND OF THE INVENTION

The difficulties associated with programming and using commercially available video cassette recorders, or VCRs, are widespread. Indeed, such problems are so common that VCR programming is the source of considerable discussion and levity concerning the ordinary consumer's inability to master a standard piece of TV-related equipment.

Many factors contribute to the difficulties associated with VCR usage, including the increasing number of available channels and the redoubling of equipment features and operating modes. At the same time, many of the previous problems associated with VCR programming have been minimized. For example, my issued U.S. Pat. No. 4,908,713, "VCR Programmer," provides an on-screen display which greatly simplifies programming sequences.

A remaining problem with VCR interaction concerns the use of the remote-control unit now supplied with virtually all new systems. Although many of these systems illuminate a light-emitting diode (LED) or province an on-screen display when the user presses a button on the remote unit, it forces the operator to look at the VCR or TV when entering commands. Since the operator obviously cannot view the remote unit and another piece of equipment at the same time, programming errors can result. This is ironic, as the LED and/or on-screen displays are no doubt incorporated to reduce errors. Clearly any VCR improvement capable of eliminating errors through remote keypad entry are welcome.

SUMMARY OF THE INVENTION

The present invention overcomes remote VCR programming and usage problems by providing audible feedback in response to keypad depressions. In the preferred embodiment the invention includes a remote control transmitter and a separate VCR housing with a remote-control receiver, audio signal generator and control means capable of causing the generator to produce an audio tone in response to key closures made on the remote unit. The audio tones are modulated onto an RF carrier and output to the TV through a connector and cabling, thus allowing the TV speaker to be used as an audio output device.

In an alternative embodiment, the audio generator is in the form of a speech synthesizer, and the controller causes the synthesizer to generator a human-voice message in response to commands entered via the keypad. With multi-key commands, the controller causes the synthesizer to summarize the entire command as well as responding to the undivided keystrokes.

In other alternative embodiments, the main VCR housing comes equipped with its own speaker, obviating the need to feed the audio signals to the TV. Additionally, the VCR may be equipped with a direct audio output, now common in modern VCRs, eliminating the need to modulate the audio signal onto an RF carrier.

DETAILED DESCRIPTION OF THE PREFERRED EMBODIMENTS

Figure 1:
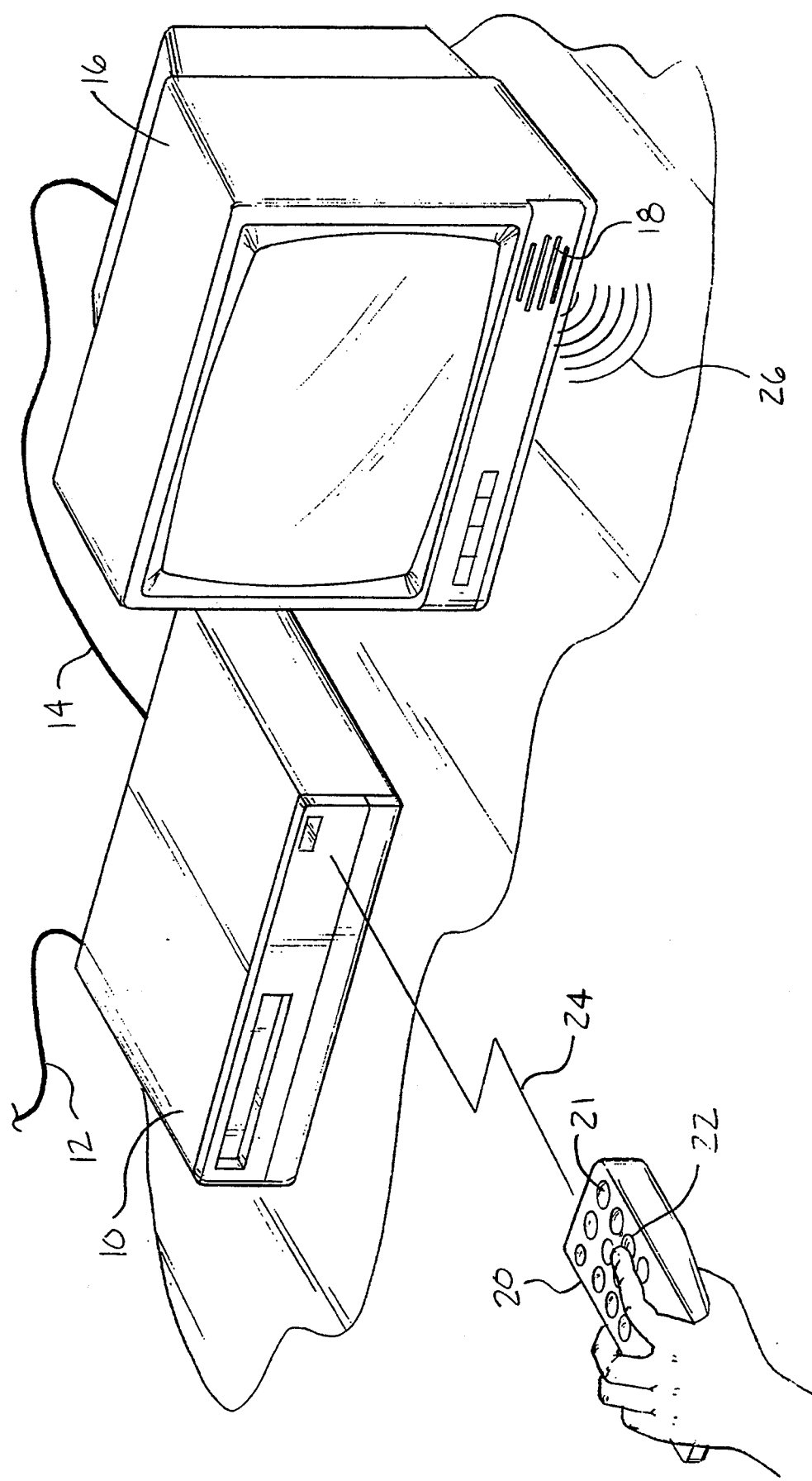
FIG. 1 is a perspective drawing of the present invention in use.

Referring to FIG. 1, there is depicted a perspective drawing of the present invention in use. The main VCR housing, 10, has connectors (not shown) to receive and incoming source of cable TV 12 and to interface to a television (TV) receiver, 16. The TV is equipped with a speaker, 18, which can generate sound in the form of acoustic waves 26.

The VCR remote unit 20 has a keypad 21 for entering operator commands. The figure shows a user pressing a key, 22, which causes a transmitter in the remote to generate an transmit control codes representative of the desired command, preferably in the form of an infrared signal 24, though any means of communication between the remote a the main housing may be used. In response to this key closure, a tone emanates from speaker 18 on TV 16.

Figure 2:
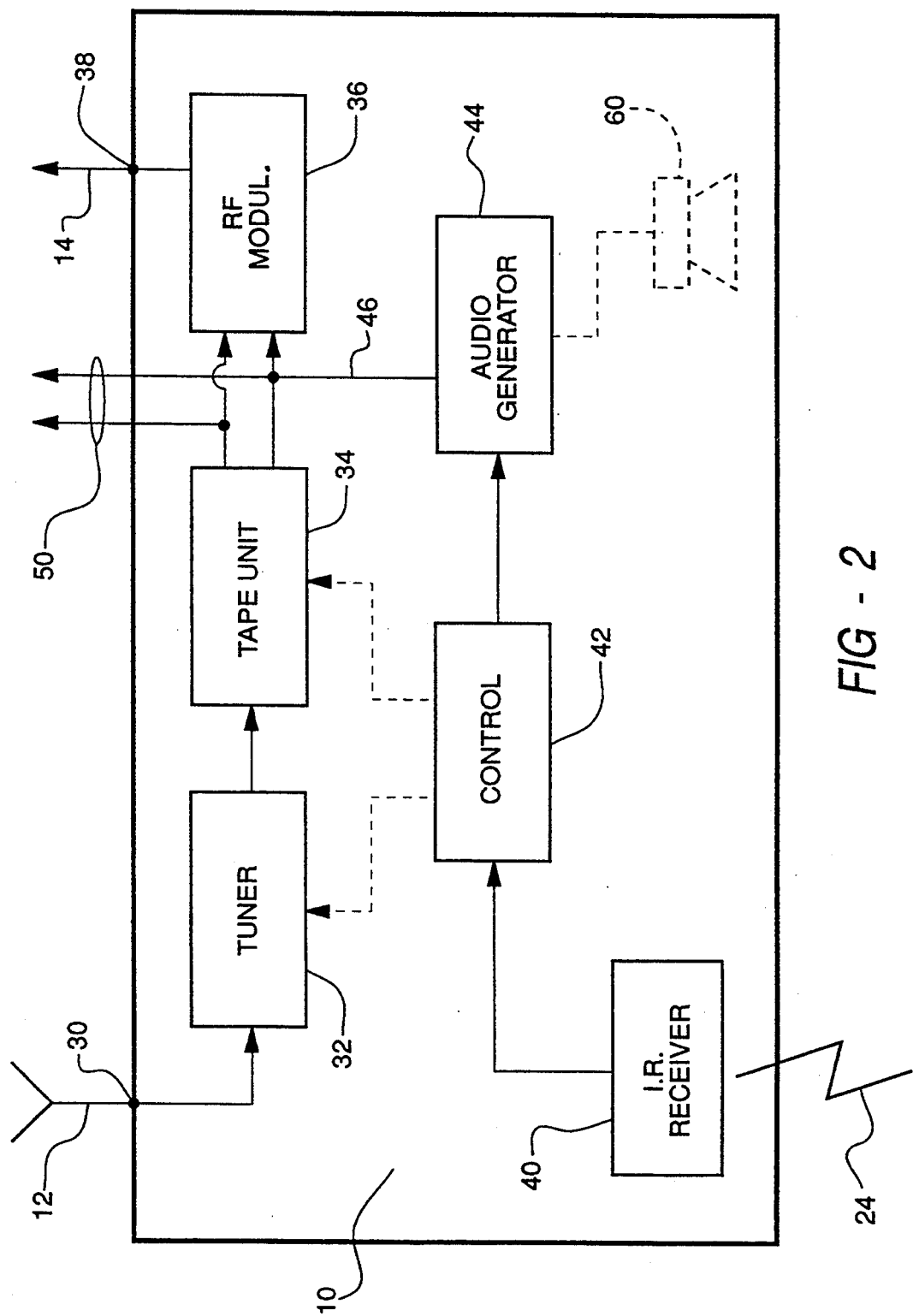
FIG. 2 is a block diagram of the electronic circuitry of the present invention.

FIG. 2 is a block diagram depicting the electronic circuitry comprising the hardware of the present invention. Incoming cable 12 enters main housing 10 through connector 30 and feeds multi-channel tuner 32 which demodulates video program information present on a desired channel. The video signal is fed to tape unit 34 for recording, or straight through for viewing the desired channel.

The output of tape unit 34 is fed to an RF modulator 36, which modulates the signal from the tape unite or tuner onto a baseband VHF channel such as channel 2 or 3 to be viewed on TV 16. Alternatively, with more modern VCRs, program information made be output in the form of separate audio and video signals 50.

An infrared control-code signal 24 is picked up by an IR receiver 40 and interpreted by control unit 42. In addition to directing the operation of tuner 32, tape unit 34 and other VCR components, the control unit causes audio generator 44 to generate an audio signal in response to key closures made on keypad 21 of remote unit 20. The audio signal is fed to RF modulator 36 to be carried on cable 14 to the TV set as a modulated RF signal, or it may be output directly via lines 50. In an alternative embodiment, the audio generator can feed a speaker 60 within the main VCR enclosure, in which case connections between the audio generator and RF modulator would not be necessary.

In operation in the preferred embodiment, the audio generator develops the same audio signal in response to key closures on the remote, regardless of the key depressed. In an alternative embodiment, however, the audio signal produced may be varied in accordance with the key depressed. For example, in another alternative embodiment, the audio generator may take the form of a speech synthesizer capable of generating a voice message in response to the key closures on the remote. The speech synthesizer may incorporate either be a true speech synthesis device, such as those available from Texas Instruments, Inc. or it may be implemented in the form of pre-digitized messages stored in a memory and a digital-to-analog (D-A) converter. In the latter case, the control unit would look up the appropriate response in the memory and deliver it to the (D-A) unit.

If the speech synthesis alternative embodiment is used, the voice messages will have utility beyond simply providing feedback to key closures. If the system incorporates on-screen programming, the speech synthesis unit may be used as an adjunct to generate voice messages pertaining to the programming sequences, for example, to verify desired menu selections. With multi-key commands, the controller causes the synthesizer to wait until the entire command has been entered before generating a comprehensive response to complex sequences.

I claim:

1. A VCR providing audible feedback through an associated television receiver, comprising:
    a remote control unit including a keypad operative to accept user commands and a transmitter operative to transmit control codes representative of said commands;
    a housing separate from said remote unit, including:
    a remote control receiver operative to receive control codes transmitted by the remote unit;
    an audio signal generator;
    an RF modulator having as an input the output of said audio signal generator, the modulator being operative to modulate the audio signal onto an RF channel output signal;
    control means connected to the audio signal generator and the remote control receiver, said control means being operative to detect key closures on the remote keypad and cause the audio signal generator to generate an audio signal when a key is depressed; and
    a connector disposed on said housing and cabling means to deliver said RF channel output signal to said television receiver so that said audio signal may be heard through said television receiver.

2. The VCR with audible feedback of claim 1 wherein the audio signal generated by said audio signal generator in response to a remote key closure is the same audio signal regardless of which key is depressed.

3. The VCR with audible feedback of claim 1 wherein the audio signal generated by said audio signal generator in response to a remote key closure varies in accordance with which key is depressed.

4. The VCR with audible feedback of claim 3 wherein said audio signal generator includes a speech synthesizer, and wherein said control means is operative to cause said synthesizer to generate a signal representative of a voice message relating to the command entered in accordance with key depressions on the remote unit.

5. The VCR with audible feedback of claim 4 wherein said control means is further operative to delay the generation of said voice message until detecting a plurality of key closures in order to interpret complex commands.

6. The VCR with audible feedback of claim 1 further including a non-modulated audio output and associated connector disposed on said housing to deliver said non-modulated output directly to said television receiver.

7. In a VCR with a remote control unit, the method of providing audible feedback through an associated TV in response to keypad depressions made on the VCR remote control unit, comprising the steps of:
    transmitting to the VCR a signal related to a keypad depression made on its associated remote unit;
    receiving said keypad-related signal at the VCR;
    generating an audio signal in response no said keypad-related signal; and
    outputting an audio signal to the TV by modulating said audio signal onto an RF carrier.

8. The method of claim 7 wherein the step of generating an audio signal in response to said received signal includes the step of synthesizing a human voice message relating to said keypad depression.

* * * * *